(12) United States Patent
Higami et al.

(10) Patent No.: US 7,060,748 B2
(45) Date of Patent: Jun. 13, 2006

(54) CATALYST PASTE COMPOSITION FOR ELECTRODE

(75) Inventors: Makoto Higami, Tokyo (JP); Keiichi Bessho, Tokyo (JP)

(73) Assignees: JSR Corporation, Tokyo (JP); Honda Motor Co.,Ltd., Tokyo (JP)

( * ) Notice: Subject to any disclaimer, the term of this patent is extended or adjusted under 35 U.S.C. 154(b) by 7 days.

(21) Appl. No.: 10/483,421

(22) PCT Filed: May 20, 2003

(86) PCT No.: PCT/JP03/06266

§ 371 (c)(1),
(2), (4) Date: Jan. 21, 2004

(87) PCT Pub. No.: WO03/098723

PCT Pub. Date: Nov. 27, 2003

(65) Prior Publication Data

US 2004/0157107 A1    Aug. 12, 2004

(30) Foreign Application Priority Data

May 21, 2002  (JP) .............................. 2002-146620

(51) Int. Cl.
*C08L 3/04*   (2006.01)
*C08L 3/09*   (2006.01)
*C08L 9/00*   (2006.01)

(52) U.S. Cl. ...................... 524/495; 524/439; 524/440; 524/571; 524/572; 524/575; 524/547; 524/544

(58) Field of Classification Search ................ 524/575, 524/547, 495, 439, 544, 572, 577, 440, 571
See application file for complete search history.

(56) References Cited

U.S. PATENT DOCUMENTS

| | | | | |
|---|---|---|---|---|
| 4,255,312 A | * | 3/1981 | Araki et al. | 524/556 |
| 5,135,675 A | * | 8/1992 | Elliott et al. | 510/221 |
| 5,962,169 A | * | 10/1999 | Angell et al. | 429/309 |
| 6,492,295 B1 | * | 12/2002 | Hitomi et al. | 502/159 |
| 6,670,065 B1 | * | 12/2003 | Koyama et al. | 429/33 |
| 6,818,339 B1 | * | 11/2004 | Sugawara et al. | 429/30 |
| 2002/0172850 A1 | * | 11/2002 | Asano et al. | 429/33 |

FOREIGN PATENT DOCUMENTS

| | | |
|---|---|---|
| JP | 11-067224 | 3/1999 |
| JP | 2002-134119 | 5/2002 |

* cited by examiner

*Primary Examiner*—David W. Wu
*Assistant Examiner*—Rip A Lee
(74) *Attorney, Agent, or Firm*—Arent Fox PLLC

(57) ABSTRACT

A catalyst paste composition for making electrodes has a uniform dispersion condition of a carbon black supporting a hydrogen reduction catalyst and is excellent in storage stability. The catalyst paste composition comprises a carbon black supporting a hydrogen reduction catalyst, an electrolyte, a water-soluble sulfonated polymer and a solvent.

9 Claims, No Drawings

# CATALYST PASTE COMPOSITION FOR ELECTRODE

CROSS-REFERENCE TO RELATED APPLICATION

This application is a National Stage entry of International Application Number PCT/JP03/06266, filed May 20, 2003. The disclosure of the prior application is hereby incorporated herein in its entirety by reference.

FIELD OF THE INVENTION

The present invention relates to a catalyst paste composition for making electrode layers of fuel cells and the like.

BACKGROUND ART

Fuel cells are generally manufactured with electrode layers and a proton conductive layer. The electrode layers used in fuel cells are conventionally produced by applying a catalyst paste that contains carbon supporting a hydrogen reduction catalyst, on carbon paper and heat treating the resultant coating.

However, it has been a problem with those electrode catalyst pastes that the carbon supporting a hydrogen reduction catalyst per se cannot be dispersed uniformly within a water-containing solvent. Mechanical mixing or a similar treatment can produce only a temporary effect, and the paste cannot maintain uniformity until applied on carbon paper so that the resulting electrode layer will be nonuniform.

As such, there has been a demand for a catalyst paste for electrodes production in which the carbon supporting a hydrogen reduction catalyst has been dispersed uniformly and with excellent storage stability.

In consideration of the above circumstances, the present invention has an object of providing a catalyst paste composition for the making of electrodes that has a uniform dispersion condition of carbon supporting a hydrogen reduction catalyst and is excellent in storage stability.

DISCLOSURE OF THE INVENTION

To achieve the aforesaid object, the invention provides the following:

(1) A catalyst paste composition for making electrodes, comprising a carbon black supporting a hydrogen reduction catalyst, an electrolyte, a water-soluble sulfonated polymer and a solvent.

(2) The catalyst paste composition as described in (1), wherein the water-soluble sulfonated polymer is a sulfonated conjugated diene polymer or a sulfonated aromatic polymer.

(3) The catalyst paste composition as described in (2), wherein the sulfonated conjugated diene polymer is at least one polymer selected from a sulfonated polybutadiene, a sulfonated polyisoprene, a sulfonated styrene/butadiene copolymer and a sulfonated styrene/isoprene copolymer.

(4) The catalyst paste composition as described in (1), wherein the electrolyte is a perfluorohydrocarbon-based sulfonic acid polymer.

BEST MODE FOR CARRYING OUT THE INVENTION

Hereinbelow, the present invention will be described in more detail.

The catalyst paste composition for making electrodes according to the invention contains a carbon black supporting a hydrogen reduction catalyst, an electrolyte, a water-soluble sulfonated polymer and a solvent.

Each component used in the catalyst paste composition will be discussed first.

(Hydrogen Reduction Catalyst)

The hydrogen reduction catalyst for use in the invention is preferably a noble metal catalyst, such as platinum, palladium, gold, ruthenium or iridium. The hydrogen reduction catalyst may contain two or more such elements; that is, alloys and mixtures of these noble metal catalysts are also available.

(Carbon Black)

For use as the carbon black in the invention, oil furnace blacks, channel blacks, lamp blacks, thermal blacks and acetylene blacks are preferable due to their good electron conductivities and large specific surface areas.

The oil furnace blacks include those carbon blacks commercially available under the trademarks of VULCAN XC-72, VULCAN P, BLACK PEARLS 880, BLACK PEARLS 1100, BLACK PEARLS 1300, BLACK PEARLS 2000, REGAL 400 (all available from Cabot Corporation), KETJENBLACK EC (available from Lion Corporation), and product Nos. 3150 and 3250 of Mitsubishi Chemical Corporation. The acetylene blacks include DENKA BLACK™ (available from Denki Kagaku Kogyo K.K.).

Furthermore, natural graphites, pitches, cokes, carbon, and synthetic graphites obtained from organic compounds such as polyacrylonitriles, phenolic resins and furan resins, may also be used.

These carbon materials may be in the form of particles or fibers.

(Electrolyte)

The electrolyte for use in the invention is preferably a polymer having proton exchange groups for enhancing the proton conductivity of the catalyst layer. The proton exchange groups in the polymer include sulfonic groups, carboxylic groups and phosphoric groups, but are not particularly limited thereto. Although the polymer with proton exchange groups may be selected without limitation, a proton-exchange polymer composed of a fluoroalkyl main chain and a fluoroalkyl ether side chain, or a sulfonated polyarylene may be preferably employed. Moreover, fluorine-containing polymers, ethylene or styrene polymers, copolymers and blends thereof that contain the proton exchange groups are also available.

The polymer having proton exchange groups used herein as the electrolyte is insoluble in water.

(Water-Soluble Sulfonated Polymer)

The water-soluble sulfonated polymer for use in the invention may be obtained by sulfonating a base polymer resulting from polymerization of one or both of a diene monomer and an aromatic vinyl monomer as essential component(s).

The diene monomers for synthesis of the base polymer include conjugated or non-conjugated, aliphatic or alicyclic dienes of 4 to 9 carbon atoms that may have a branch, such as 1,3-butadiene, 1,2-butadiene, 1,2-pentadiene, 1,3-pentadiene, 2,3-pentadiene, isoprene, 1,2-hexadiene, 1,3-hexadiene, 1,4-hexadiene, 1,5-hexadiene, 2,3-hexadiene, 2,4-hexadiene, 2,3-dimethyl-1,3-butadiene, 2-ethyl-1,3-butadiene, 1,2-heptadiene, 1,3-heptadiene, 1,4-heptadiene, 1,5-heptadiene, 1,6-heptadiene, 2,3-heptadiene, 2,5-heptadiene, 3,4-heptadiene, 3,5-heptadiene, cyclopentadiene, dicyclopentadiene and ethylidene norbornene. These may be used singly or in combination of two or more kinds.

Of these, the conjugated dienes such as 1,3-butadiene, isoprene, 1,3-pentadiene and 1,3-cyclopentadiene are preferable.

The aromatic vinyl monomers for synthesis of the base polymer include styrene, α-methylstyrene, o-methylstyrene, p-methylstyrene, m-methylstyrene and vinyl naphthalene.

To obtain the base polymer, the aforesaid monomer(s) can be (co)polymerized in the presence of a radical or anionic polymerization initiator optionally with use of a known solvent. The radical polymerization initiators include hydrogen peroxide, benzoyl peroxide and azobisisobutyronitrile. The anionic polymerization initiators include n-butyl lithium, sodium naphthalene and sodium metal.

The base polymer may be sulfonated after part of its residual double bonds has been hydrogenated. For this purpose, a common hydrogenation catalyst may be employed. For example, JP-A-5/222115 describes hydrogenation catalysts and methods. The hydrogenation and sulfonation of the base (co)polymer may be carried out in the order named or the reversed order. The sulfonation method will be described later.

Exemplary base polymers include isoprene homopolymers, butadiene homopolymers, isoprene/styrene random copolymers, isoprene/styrene block copolymers, styrene/isoprene/styrene block terpolymers, styrene/butadiene random copolymers, styrene/butadiene block copolymers, styrene/butadiene/styrene block copolymers, hydrogenated products of these (co)polymers, and ethylene/propylene/diene terpolymers. Of these, the conjugated diene polymers and the aromatic polymers are preferred, and polybutadiene, polyisoprene, styrene/butadiene copolymers and styrene/isoprene copolymers are more preferred.

Preferably, the base polymer or hydrogenated base polymer will range in weight-average molecular weight (Mw) in terms of polystyrene from 3,000 to 1,000,000, more preferably from 5,000 to 500,000, and particularly preferably from 10,000 to 400,000. The weight-average molecular weight within this range will allow the resultant sulfonated polymer to fully function as a dispersant.

The sulfonation of the base polymer may be carried out by a known method. For example, the water-soluble sulfonated polymer may be obtained by a method described in Shin Jikken Kagaku Kouza (Courses in Experimental Chemistry, vol. 14 III, P.1773, edited by The Chemical Society of Japan) or in JP-A-2/227403.

Preferably, the water-soluble sulfonated polymer will contain the sulfonic group in a proportion of not less than 1.5 mmol/g, and more preferably not less than 2 mmol/g. The sulfonic group content of less than 1.5 mmol/g may lead to insufficient hydrophilicity, ion trapping properties and other functions, and will also make the polymer less soluble in water so that the coating with an aqueous solvent becomes infeasible.

(Solvent)

The solvent for use in the invention essentially contains water (10–100 wt % of the solvent) and optionally an organic solvent (0–90 wt % of the solvent). The organic solvents miscible with water include alcohols such as methanol, ethanol, n-propanol and 2-propanol; cyclic ethers such as furan, tetrahydrofuran and dioxane; and ketones such as acetone. These organic solvents may be used singly or in combination of two or more kinds.

Of the above organic solvents, the alcohols are particularly preferable in view of enhancing dispersion condition of the resultant paste.

(Composition)

Desirably, the catalyst paste composition for electrodes will contain:

2 to 20 wt %, preferably 3 to 15 wt % of the carbon black supporting the hydrogen reduction catalyst;

3 to 25 wt %, preferably 3 to 15 wt % of the electrolyte;

0.1 to 20 wt %, preferably 2 to 20 wt % of the water-soluble sulfonated polymer;

10 to 70 wt % of water; and 20 to 70 wt % of the organic solvent.

The catalyst paste composition may be produced by mixing the aforesaid components in a predetermined proportion and kneading the mixture by a common procedure.

(Application)

The catalyst paste composition may be applied on an electrode substrate or a proton conductive layer to form an electrode catalyst layer.

The application methods include brushing, brush coating, bar coating, knife coating, screen printing and spray coating. Alternatively, the paste composition may be applied on a substrate (transfer substrate) and thereafter the thus-formed electrode catalyst layer may be transferred onto an electrode substrate or a proton conductive layer. The transfer substrate may be a polytetrafluoroethylene (PTFE) sheet or a glass or metal plate whose surface has been treated with a releasing agent.

The electrode substrate for use in the invention is not particularly limited and may be selected from those electrode substrates generally used in fuel cells. Examples thereof include porous conductive sheets mainly composed of conductive substances. The conductive substances include calcined polyacrylonitriles, calcined pitches, carbon materials such as graphites and expanded graphites, stainless steel, molybdenum and titanium. The conductive substances may exist in the form of fibers or particles, but are not limited thereto. Fibrous conductive inorganic substances (inorganic conductive fibers), particularly carbon fibers, are preferable. The porous conductive sheets made of such inorganic conductive fibers may be woven or nonwoven fabrics. The woven fabrics may be, although not particularly limited to, plain fabrics, twill fabrics, satin fabrics, designed fabrics and figured fabrics. The nonwoven fabrics may be, although not particularly limited to, felted nonwoven fabrics, needle punched nonwoven fabrics, spunbonded nonwoven fabrics, water jet punched nonwoven fabrics and meltblown nonwoven fabrics. Knitted fabrics are also usable. These fabrics, particularly when using carbon fibers, are preferably woven fabrics obtained through carbonization or graphitization of plain fabrics of flame-resistant spun yarns, or nonwoven fabrics obtained through carbonization or graphitization of needle punched or water jet punched nonwoven fabrics of flame-resistant yarns, or nonwoven mats obtained by papermaking technique for flame-resistant yarns, carbonized yarns or graphitized yarns. As the carbon paper, carbon paper TGP series and SO series (available from Toray Industries, Inc.) and carbon cloths produced by E-TEK may be preferably used. According to a preferred embodiment of the invention, conductive particles such as carbon blacks, or conductive fibers such as carbon fibers may be incorporated in the porous conductive sheet used in the invention. The incorporation is advantageous in that such conductive materials play an auxiliary roll to provide a higher conductivity. It will be appreciated that the auxiliary conductive materials are not limited to those listed above.

EXAMPLES

The present invention will be hereinafter described in detail by the following Example, but it should be construed that the invention is in no way limited thereto.

Example 1

A 250 ml plastic bottle was charged with:
3.0 g of platinum-supporting carbon particles (trade name: VULCAN XC-72R carbon available from Electro-Chem, Inc., Pt content: 20 wt %);
50 g of a water-alcohol solution containing 10 wt % of Nafion (trade name, available from DuPont) (water:alcohol=15:85 by weight);
10 g of a sulfonated block copolymer of 30 wt % styrene and isoprene (styrene:isoprene=80:20 (by weight), Mn: 20,000, Mw: 30,000, sulfonic group: 2.16 mEq/g); and
37.0 g of distilled water.
After 300 g of zirconia balls (diameter≠1.0 mm) had been added, the mixture was stirred for 1 hour with a paint mixing and conditioning machine (trade name: Heavy Duty Mixer 5410 available from Red Devil Equipment Co.). A catalyst paste composition for making electrodes was thus obtained.

COMPARATIVE EXAMPLE 1

A 250 ml plastic bottle was charged with:
3.0 g of platinum-supporting carbon particles (trade name: VULCAN XC-72R carbon available from DuPont, Pt content: 20 wt %);
50 g of a water-alcohol solution containing 10 wt % of Nafion (trade name, available from Aldrich) (water:alcohol=15:85 by weight); and
47.0 g of distilled water.
After 300 g of zirconia balls (diameter≠1.0 mm) had been added, the mixture was stirred for 1 hour with a paint mixing and conditioning machine (trade name: Heavy Duty Mixer 5410 available from Red Devil Equipment Co.). A catalyst paste composition for making electrodes was thus obtained.

[Evaluation Procedure]

(Dispersion Condition)

The dispersion condition resulting after the 1-hour stirring by the paint conditioner and its storage stability (occurrence of carbon particle sedimentation) were observed.

(Application Properties)

The catalyst paste compositions were separately applied on Teflon-treated carbon paper (a product of Toray Industries, Inc.) with use of a doctor blade. The resultant coatings were dried in a hot oven at 80° C. for 1 hour. The formed layers were observed for the presence of cissing and particle flocculation.

The results are shown in Table 1.

TABLE 1

| | Dispersion condition | Storage stability | Application properties |
|---|---|---|---|
| Example 1 | Uniform dispersion | No particle sedimentation | Uniform application |
| Comparative Example 1 | No fluidity, solid paste | Instant particle sedimentation | Application impossible |

The invention claimed is:

1. A catalyst paste composition for making electrodes, comprising a water-soluble sulfonated polymer, a carbon black supporting a hydrogen reduction catalyst and an electrolyte.

2. The catalyst paste composition according to claim 1, wherein the electrolyte is a perfluorohydrocarbon-based sulfonic acid polymer.

3. The catalyst paste composition according to claim 1, wherein the water-soluble sulfonated polymer is a sulfonated conjugated diene polymer or a sulfonated aromatic polymer.

4. The catalyst paste composition according to claim 1, wherein the electrolyte is insoluble in water.

5. The catalyst paste composition according to claim 1, further comprising a solvent.

6. A catalyst paste composition for making electrodes, comprising a water-soluble sulfonated polymer, a carbon black supporting a hydrogen reduction catalyst and a solvent, wherein the sulfonated polymer is at least one polymer selected from a sulfonated polybutadiene, a sulfonated polyisoprene, a sulfonated styrene/butadiene copolymer or a sulfonated styrene/isoprene copolymer.

7. The catalyst paste composition according to claim 6, further comprising an electrolyte.

8. The catalyst paste composition according to claim 7, wherein the electrolyte is a perfluorohydrocarbon-based sulfonic acid polymer.

9. The catalyst paste composition according to claim 7, wherein the electrolyte is insoluble in water.

* * * * *